(12) United States Patent
Iszlai et al.

(10) Patent No.: US 10,389,542 B2
(45) Date of Patent: Aug. 20, 2019

(54) MULTICAST HELPER TO LINK VIRTUAL EXTENSIBLE LANS

(71) Applicant: INTERNATIONAL BUSINESS MACHINES CORPORATION, Armonk, NY (US)

(72) Inventors: Gabriel Iszlai, Toronto (CA); Jun Jie Nan, Beijing (CN); Hong Jun Tu, Beijing (CN); Guang Yi Xu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 381 days.

(21) Appl. No.: 15/416,306

(22) Filed: Jan. 26, 2017

(65) Prior Publication Data

US 2018/0212788 A1 Jul. 26, 2018

(51) Int. Cl.
  *H04L 12/18* (2006.01)
  *H04L 12/46* (2006.01)
  *H04L 29/12* (2006.01)

(52) U.S. Cl.
  CPC .......... *H04L 12/18* (2013.01); *H04L 12/1854* (2013.01); *H04L 12/4641* (2013.01); *H04L 61/103* (2013.01); *H04L 61/2015* (2013.01); *H04L 61/6022* (2013.01)

(58) Field of Classification Search
  CPC . H04L 12/18; H04L 12/1854; H04L 12/4641; H04L 61/103; H04L 61/2015; H04L 61/6022
  See application file for complete search history.

(56) References Cited

U.S. PATENT DOCUMENTS

| | | | |
|---|---|---|---|
| 9,014,007 B2 | 4/2015 | Bhikkaji et al. | |
| 2013/0250951 A1* | 9/2013 | Koganti | H04L 49/356 370/390 |
| 2014/0208317 A1* | 7/2014 | Nakagawa | G06F 9/45533 718/1 |
| 2015/0016300 A1 | 1/2015 | Devireddy et al. | |

(Continued)

OTHER PUBLICATIONS

Peter Mell et al, The NIST Definition of Cloud Computing, National Institute of Standards and Technology, Publication 800-145, 2011.

*Primary Examiner* — Natasha W Cosme
(74) *Attorney, Agent, or Firm* — Patrick J. Daugherty; Daugherty & Del Zoppo Co., LPA

(57) ABSTRACT

Computerized aspects monitor listening virtual local area network ports for multicast packets from hypervisor virtual machines that meet a multicast group definition, and retrieve source addresses for original hypervisor sources of detected ones of the multicast packets, bind the retrieved addresses to the multicast packets to generate encapsulated packets, and forward the encapsulated packets as user datagram protocol unicast packets to a destination address of a virtual extensible helper daemon defined for a destination hypervisor of a second virtual local area network. The destination address meets the multicast group definition for the first virtual local area network, and the second virtual local area network is geographically remote from and different from the first virtual local area network, and thus the aspects send the first user datagram protocol unicast packet through an internet protocol router to the designated receiving port.

20 Claims, 5 Drawing Sheets

(56) References Cited

U.S. PATENT DOCUMENTS

2015/0358232 A1 12/2015 Chen et al.
2016/0119156 A1 4/2016 Drake et al.
2016/0212067 A1 7/2016 Wu

* cited by examiner

MULTICAST HELPER TO LINK VIRTUAL EXTENSIBLE LANS

BACKGROUND

Network virtualization refers to structures and processes for combining computer hardware and computer software network resources and network functionality into a single, software-based administrative entity, sometimes referred to as a virtual network. Network virtualization involves platform virtualization, often combined with resource virtualization.

A hypervisor or virtual machine monitor (VMM) is a piece of computer software, firmware or hardware that creates and runs virtual machines. A computer on which a hypervisor runs one or more virtual machines is called a host machine, and each virtual machine is called a guest machine.

A virtual local area network (VLAN) is a broadcast domain partitioned and isolated in a computer network at a data link layer, generally referred to as "layer 2" of the Open Systems Interconnection model (OSI model), a conceptual model that characterizes and standardizes the communication functions of a telecommunication or computing system without regard to its underlying internal structure and technology.

A data center is a facility used to house computer systems and associated components, such as telecommunications and storage systems. It generally includes redundant or backup power supplies, redundant data communications connections, environmental controls (e.g., air conditioning, fire suppression) and various security devices. Computers located in different data centers may find and communicate with each other via their media access control addresses (MAC addresses), unique identifiers assigned to network interfaces for communications at the data link layer of a network segment. MAC addresses are used as a network address for most IEEE 802 network technologies, including Ethernet and WiFi. Logically, MAC addresses are used in the media access control protocol sublayer of the OSI reference model.

Virtual Extensible LAN (VXLAN) is a network virtualization technology that uses a VLAN-like encapsulation technique to encapsulate MAC-based OSI layer 2 Ethernet frames within OSI layer 4 User Datagram Protocol (UDP) packets. VXLAN endpoints, which terminate VXLAN tunnels and may be both virtual or physical switch ports, are known as VXLAN tunnel endpoints (VTEPs). The VTEP is a host interface which forwards Ethernet frames from a virtual network via VXLAN, or vice-versa.

VXLAN is widely used as virtual network standard in cloud computing field to increase scalability to logical networks, and allows for layer 2 adjacencies across IP networks. Multicast or unicast with HER (Head-End Replication) is used to flood BUM (broadcast, unknown destination address, multicast) traffic. In computer networking, multicast (one-to-many or many-to-many distribution is a form of group communication where information is addressed to a group of destination computers simultaneously. Layer multicast enables a source to efficiently send to each member of a group in a single transmission, wherein copies are automatically created in other network elements, such as routers, switches, and cellular network base stations, but only to network segments that currently contain members of the group.

Network assisted multicast is generally implemented at the data link layer using one-to-many addressing and switching such as Ethernet multicast addressing, Asynchronous Transfer Mode (ATM) point-to-multipoint virtual circuits (P2MP) or Infiniband multicast. Network assisted multicast may also be implemented at the Internet layer using IP multicast. In IP multicast, the implementation of the multicast concept occurs at the IP routing level, where routers create optimal distribution paths for datagrams sent to a multicast destination address.

BRIEF SUMMARY

In one aspect of the present invention, a computerized method for a multicast helper to communicate between different virtual extensible local area networks includes executing steps on a computer processor. Thus, a computer processor monitors a listening port connection of a first virtual local area network for multicast packets from hypervisor virtual machines of the first virtual local area network that meet a multicast group definition. In response to receiving, via the monitoring, a first user datagram protocol multicast packet from an original hypervisor source within the first virtual local area network that meets the multicast group definition, the processor retrieves a source address for the original hypervisor source binds the retrieved address to the multicast packet to generate a first encapsulated packet, and forwards the encapsulated packet as a first user datagram protocol unicast packet to a destination address of a virtual extensible helper daemon defined for a destination hypervisor of a second virtual local area network, via a designated receiving port of the second virtual local area network. The destination address meets the multicast group definition for the first virtual local area network, and the second virtual local area network is geographically remote from and different from the first virtual local area network, and thus the aspect sends the first user datagram protocol unicast packet through an internet protocol router to the designated receiving port.

In another aspect, a system has a hardware processor in circuit communication with a computer readable memory and a computer-readable storage medium having program instructions stored thereon. The processor executes the program instructions stored on the computer-readable storage medium via the computer readable memory and thereby monitors a listening port connection of a first virtual local area network for multicast packets from hypervisor virtual machines of the first virtual local area network that meet a multicast group definition. In response to receiving, via the monitoring, a first user datagram protocol multicast packet from an original hypervisor source within the first virtual local area network that meets the multicast group definition, the processor retrieves a source address for the original hypervisor source binds the retrieved address to the multicast packet to generate a first encapsulated packet, and forwards the encapsulated packet as a first user datagram protocol unicast packet to a destination address of a virtual extensible helper daemon defined for a destination hypervisor of a second virtual local area network, via a designated receiving port of the second virtual local area network. The destination address meets the multicast group definition for the first virtual local area network, and the second virtual local area network is geographically remote from and different from the first virtual local area network, and thus the aspect sends the first user datagram protocol unicast packet through an internet protocol router to the designated receiving port.

In another aspect, a computer program product for a multicast helper to communicate between different virtual extensible local area networks has a computer-readable storage medium with computer readable program code embodied therewith. The computer readable hardware medium is not a transitory signal per se. The computer readable program code includes instructions for execution which cause the processor to monitor a listening port connection of a first virtual local area network for multicast packets from hypervisor virtual machines of the first virtual local area network that meet a multicast group definition. In response to receiving, via the monitoring, a first user datagram protocol multicast packet from an original hypervisor source within the first virtual local area network that meets the multicast group definition, the processor is caused to retrieve a source address for the original hypervisor source binds the retrieved address to the multicast packet to generate a first encapsulated packet, and forward the encapsulated packet as a first user datagram protocol unicast packet to a destination address of a virtual extensible helper daemon defined for a destination hypervisor of a second virtual local area network, via a designated receiving port of the second virtual local area network. The destination address meets the multicast group definition for the first virtual local area network, and the second virtual local area network is geographically remote from and different from the first virtual local area network, and thus the aspect sends the first user datagram protocol unicast packet through an internet protocol router to the designated receiving port.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
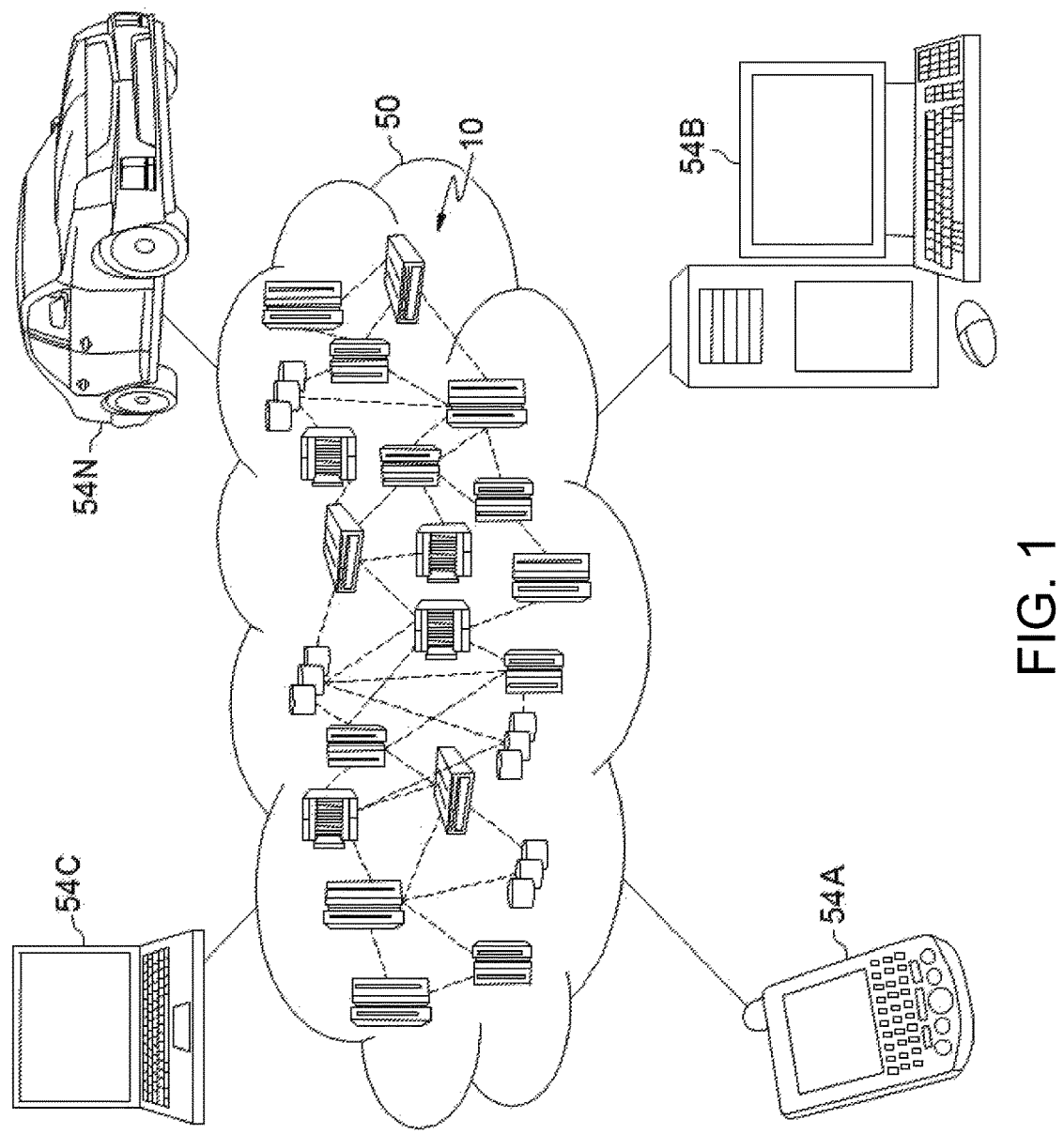
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
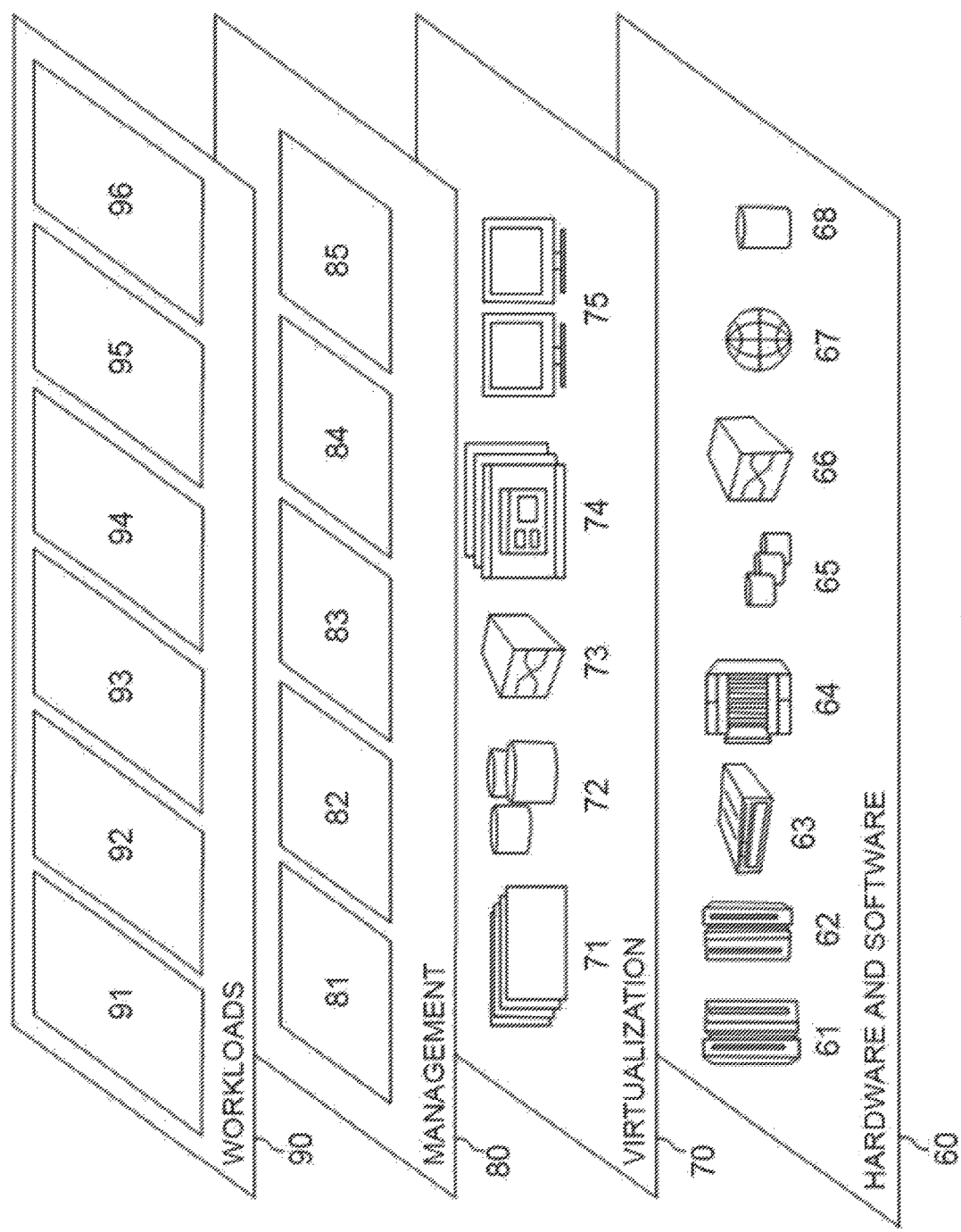
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a multicast helper to link different virtual extensible local area networks 96.

VLAN's are generally configured to block packets from other VLAN's with different identifier indicia (ID's). This presents problems in prior art VXLAN implementations, such as in public cloud infrastructures, where hypervisors are located in different VLANs or different data centers located in different geographic regions. In typical prior art systems, Virtual Machines (VMs) cannot generally access each other easily through VXLAN virtual networks when the hypervisors are placed in different regions, even though the VMs may belong to a same account.

For example, in a typical prior art VXLAN scenario a first virtual machine (VM) attempting to communicate with another, second VM that is in a different (geographically remote) data center sends an Address Resolution Protocol (ARP) communication to the second VM, wherein the VTEP of the first VM adds VXLAN headers to the ARP communication to form a UDP package that is multicast out to a multicast group address per applicable VXLAN design protocols. However, problems arise when the first machine VTEP multicasts the tunneled packet to the second VM via internet protocol (IP) routers, as public IP routers cannot generally perform multicast routing. Accordingly, the VTEP of the second VM will not receive the multicast packet including the UDP package created by the first VM VTEP, and a hypervisor hosting the second VM thereby fails to use the packet data to update a local forwarding database (FDB table) with the internet protocol (IP) address of the hypervisor hosting the first VM or the MAC address of the first VM. Accordingly, the second VM cannot communicate with the first VM where public internet routers are used to transmit the multicast packet, as is common in cloud system configurations.

Aspects of the present invention deploy "vxhelper" daemon processes running on hypervisors located in different VLAN's or DC's that, receiving multicast packets for the multicast group specified by a VXLAN, and forward everything sniffed to a cousin or peer vxhelper daemon process running on another hypervisor in another, different VLAN or DC, wherein the peer vxhelper daemon process multicasts everything received from the first vxhelper daemon process to the VLAN that it is located within. In multitasking computer operating systems, a daemon is a computer program that runs as a background process, rather than being under the direct control of an interactive user. The vxhelper daemon process may run on any hypervisor within a DC connected to a VLAN, and each VLAN in each DC needs only one vxhelper daemon process to enable multicast packet communication with all other VLANs or DCs.

Figure 3:
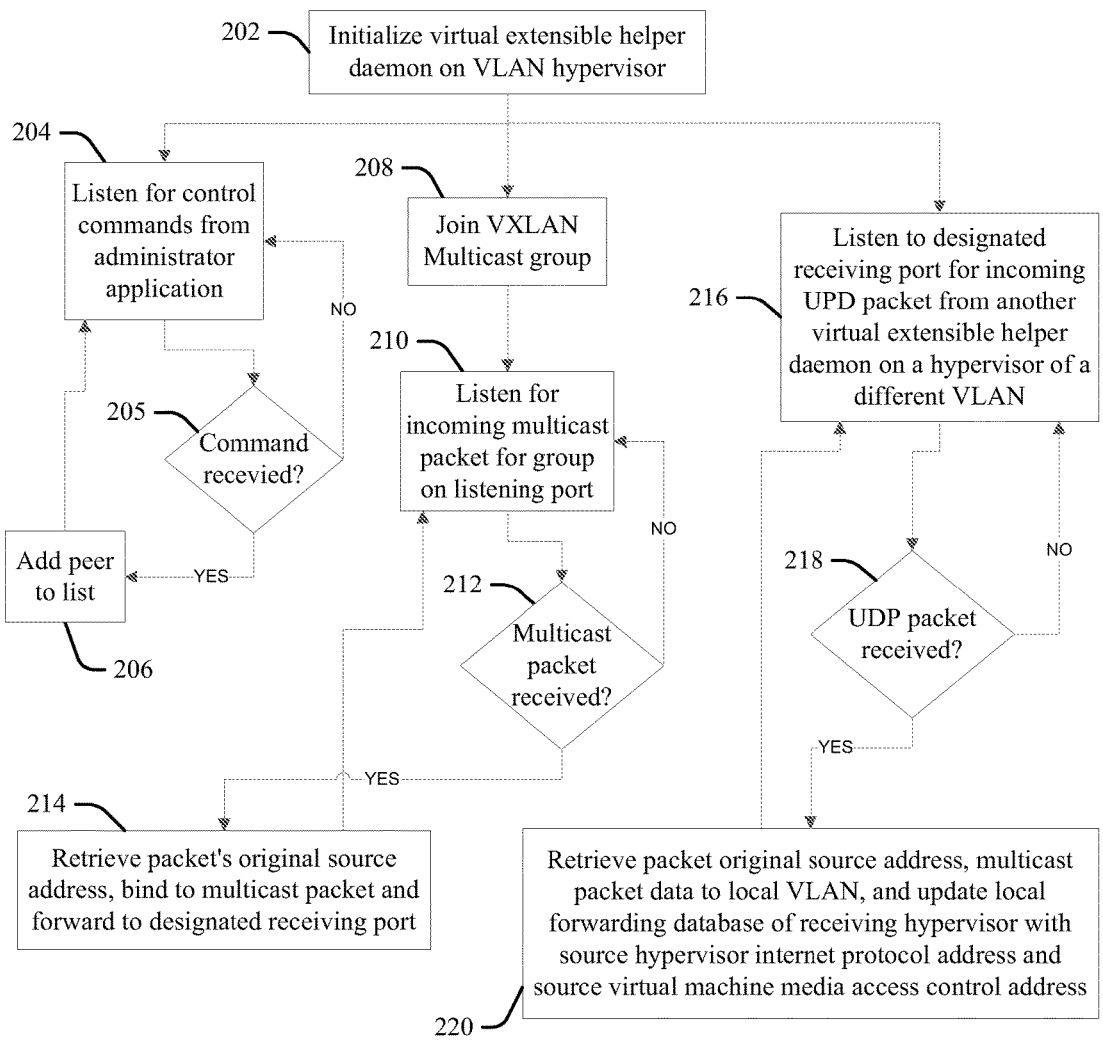
FIG. 3 is a flow chart illustration of an embodiment of the present invention.

FIG. 3 illustrates an embodiment of virtual extensible helper (hereinafter sometimes a "vxhelper") daemon process that is initialized (configured by executing program instructions according to the present invention) at 202 to run in one network namespace or VM on a hypervisor in a transparent mode, via an Ethernet interface. The vxhelper daemon performs three different functions or jobs at the same time, in parallel: at steps 204-206, listening for administrator control commands for new peer vxhelper daemon IP address data; at steps 208-214, relaying multicast packet data as UDP packets to other vxhelper daemons; and at steps 216-220, receiving UDP packets received from other vxhelper daemons and multicasting data therein on its local VLAN.

Thus, at 204 the vxhelper daemon listens (for example, waits on a Unix® socket) for controlling commands from an administrator application (generated by executing program code on a computer processor) that comprise new peer vxhelper daemon IP address data. (UNIX is a registered trademark in the United States and other countries, licensed exclusively through X/Open Company Ltd.) The controlling commands notify this vxhelper daemon process of the existence of other, peer vxhelper daemons running in other DCs, or on other VLANs. In response to receiving such a control command at 205, at 206 the vxhelper daemon adds the IP address of a new peer vxhelper daemon contained within the control command data into an internal list or database for future use.

At 208 the vxhelper daemon joins a VXLAN multicast group, and at 210 listens for any incoming UDP multicast packet for the group on an appropriate or dedicated listening port (for example, on port 8472 of an OpenStack® VXLAN implementation, though one skilled in the art will appreciate that the port number may vary for different VXLAN implementations. (OPENSTACK is a trademark of the OpenStack Foundation in the United States or other countries.)

In response to receiving a multicast packet at 212 (via listening to said listening port), at 214 the vxhelper daemon retrieves the packet's original source address from the packet field data ("S_ADDR"), binds the source address to the multicast packet to generate an encapsulated packet, and forwards the encapsulated packet to a designated or appropriate packet receiving port (for example, to port 8896 of an OPENSTACK implementation, though one skilled in the art will appreciate that the port number may vary for different VXLAN implementations). This effectively forwards the packet to other vxhelper daemon peers connected to said receiving port. Thus, when one of the other, peer vxhelper daemon receives the packet, it sees only the source IP address of the hypervisor that initially sent the multicast packet for the VXLAN.

Steps 216-220 define "receiving and multicasting" functions of the vxhelper daemon, as a peer vxhelper daemon to other vxhelper daemons sending packets as described above at steps 208-214. Thus, at 216 the vxhelper daemon listens to the designated or appropriate packet receiving port (port 8896 of an OPENSTACK implementation, or other port number for a different VXLAN implementation) for any incoming UPD packet directed to it and sent from other vxhelper daemons as generated and sent at steps 208-214. In response to receiving one of said incoming UDP packets from a peer vxhelper daemon at 218, at 220 the vxhelper daemon retrieves the packet's original source address data ("S_ADDR"), multicasts the packet to its local VLAN, and updates a local FDB(forwarding database) of a receiving hypervisor of the first virtual local area network that receives the multicast data with the retrieved original source address data, namely with an internet protocol address of the source hypervisor and a media access control address of the source virtual machine retrieved from the encapsulating source address data.

Thus, a local hypervisor (on the same VLAN and within the same DC at the receiving vxhelper daemon) with appropriate FDB table data (having sufficient and matching mapping data to the source VM MAC and source hypervisor IP) receives the original packet data and responds appropriately. As the original multicast packet generally carries only ARP, Dynamic Host Configuration Protocol (DHCP) and similar packets for VMs, after a receiving hypervisor updates its FDB table in response to the received packet, further communications on VXLAN between two VMs residing in different DCs will go via unicast channel between their hypervisors directly.

Figure 4:
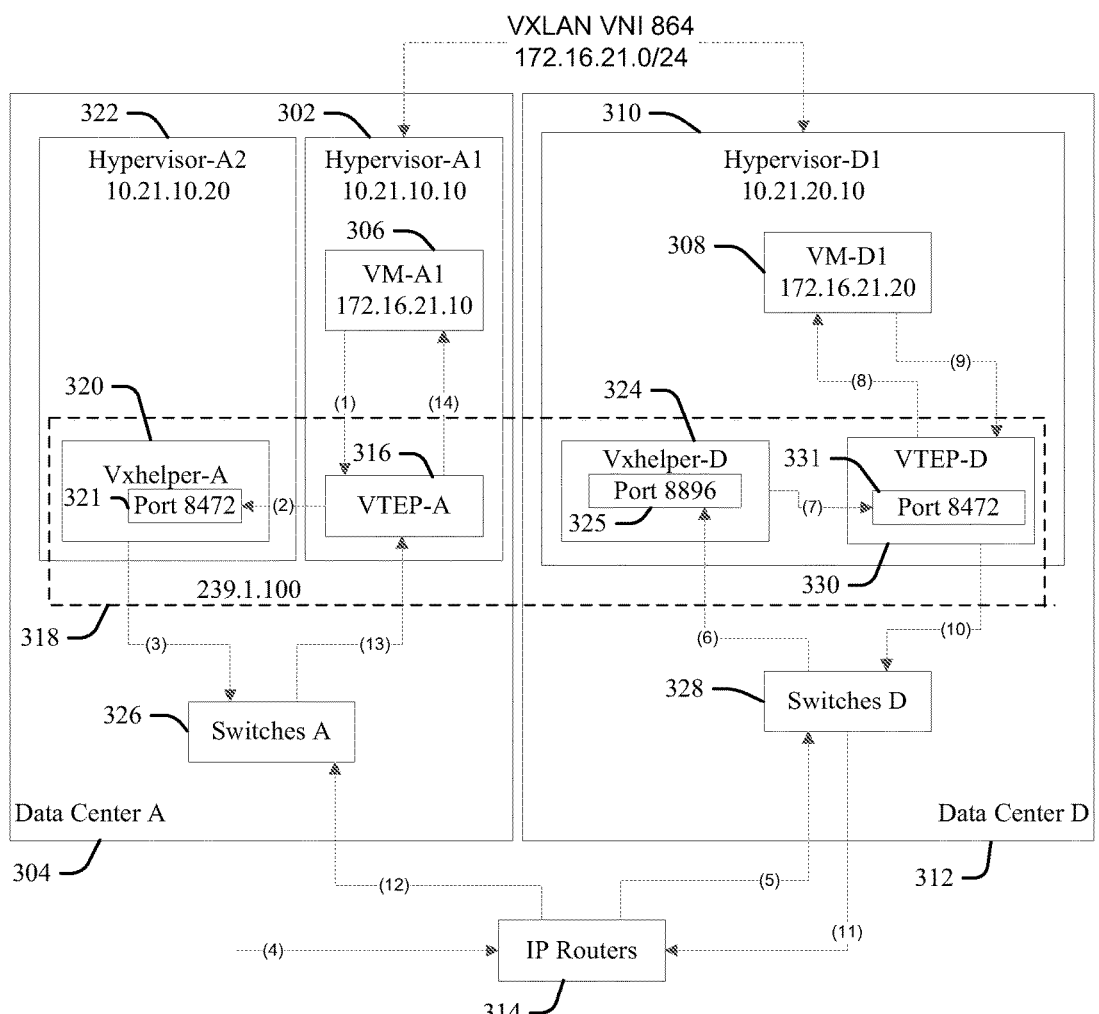
FIG. 4 is a block diagram illustration of an embodiment of the present invention.

FIG. 4 illustrates one example of a vxhelper daemon implementation according to the present invention, deployed for VXLAN multicasting via an internet protocol router. Thus, Hypervisor-A1 302 located in Data Center A 304 hosts (creates, runs, etc.) a first virtual machine VM-A1 306 that sends an Address Resolution Protocol (ARP) request to another virtual machine VM-D1 308 that is hosted by another Hypervisor-D1 310 located in a different data center, Data Center D 312, as an ARP packet broadcast (multicast) to virtual network VXLAN VNI 864. As VM-D1 is within the said VXLAN network, via hosting Hypervisor D1, it would receive the multicast packet if located within the same Data Center A 304. However, as it is in physically remote and different Data Center D 312, the multicast packet must pass through public IP Routers 314, which is generally not possible in the prior art.

To traverse this problem VXLAN tunnel endpoint VTEP-A 316 of the first hypervisor 302 receives the first ARP packet (indicated by flow pointer "(1)"), encapsulates the ARP packet for tunnel transmit to generate a first encapsulated packet comprising a VXLAN header inside, and sends the encapsulated packet via a multicast process to a multicast group 318 identified for the VXLAN, group "239.1.1.100."

Vxhelper daemon-A 320, running on a second hypervisor, Hypervisor-A2 322, within the same Data Center A 304 and configured as described above with respect to FIG. 3, listens for multicast packets on a designated port 321 of the first data center VXLAN, in the present example on port 8472 on an OPENSTACK VXLAN implementation. Via said listening the Hypervisor-A2 vxhelper daemon gets the encapsulated packet from the port 321 (indicated by flow pointer "(2)"), retrieves the source IP address of the packet (for example, 10.21.10.10) and forwards raw data from the received packet data in a User Datagram Protocol (UDP) unicast broadcast to another, peer vxhelper-D 324 running on Hypervisor-D1 324 via an IP address of said hypervisor, wherein said Hypervisor-D1 310 hosts the VM-D1 308 to which the original ARP packet is addressed.

Said UDP unicast packet is routed from the Hypervisor-A2 vxhelper-A 320 to the Hypervisor-D1 peer vxhelper daemon 324, via switches A 326 (flow pointer "(3)"), which route the packet to the public internet protocol routers 314 (flow pointer "(4)") , which routes it to switches D 328 (flow pointer "(5)") of the other, second Data Center D 312, wherein Hypervisor-D peer vxhelper-D daemon 324 gets the packet (flow pointer "(6)") via listening for UDP packets on a designated port 325 (in the present example, port 8896).

Said peer vxhelper-D daemon 324 retrieves the multicast packet encapsulating the first VM's ARP request from the UDP packet data, and multicasts said retrieved multicast packet data on its local, second VLAN to the designated multicast group address (239.1.1.100), wherein VXLAN tunnel endpoint (VTEP-D) 330 of Hypervisor-D1 310 receives (flow pointer "(7)") the first ARP packet data as broadcast on the data center D VLAN by the peer vxhelper-D daemon 324, via listening for multicast packets on the designated port 331 (OPENSTACK port number 8472).

The Hypervisor-D1 VTEP-D 330 removes the VXLAN header from the multicast packet, and broadcasts the encapsulated ARP request packet on the second VLAN, to the MAC address "172.16.21.20" of the destination VM-D1 308 running on the hypervisor (flow pointer "(8)"), and updates a local FDB table of Hypervisor-D 310 with the IP address of the sending first Hypervisor-A 302 ("10.21.10.10") and the MAC address ("172.16.21.10") of the sending VM-A 306.

In response to receiving the ARP request packet data (flow pointer "(8)"), VM-D1 sends out a unicast ARP response packet to the first VM on the VXLAN, received by Hypervisor-D1 VTEP-D 330 (flow pointer "(9)"). Hypervisor-D1 VTEP-D 330 responsively encapsulates the ARP response packet sent out by VM-D1 with additional VXLAN headers, and sends the newly formed packet in VXLAN unicast to the IP address of Hypervisor A-1 302, retrieved from the FDB as updated above, via switches D 328 (flow pointer "(10)").

Switches D 328 route said unicast response packet to the IP routers 314 (flow pointer "(11)"), which route it to switches A 326 of the first Data center A VLAN (flow pointer "(12)"), which find the correct port of Hypervisor-A1 and responsively transmit the response encapsulated packet to the Hypervisor-A1 VTEP-A 316 (flow pointer "(13)").

The Hypervisor-A1 VTEP-A 316 removes the VXLAN headers from the unicast response packet received from originating Hypervisor-D1 310, sends the raw ARP response data to VM-A1 306 (flow pointer "(14)"), and updates the FDB of Hypervisor-A1 302 with the IP address of Hypervisor-D-1 310 ("10.21.20.10") and the MAC address (172.16.21.20") of VM-D1 308. Thus, future unicasting-based communication between VM-A1 306 and VM-D1 308 will no longer require the services of the respective hypervisor vxhelper daemons.

The transparent mode vxhelper daemon configuration described above performs well when hypervisors have direct data center access to each other. However, firewalls in between the respective data centers of VLAN's may prevent direct access, wherein they may only access each other through the channel structure created between their respective vxhelper daemon process helpers. The vxhelper daemon may simply and transparently forward packets to other peers without using hypervisors' original IPs; however, when receiving packets from peers, multicast said the packets may cause a "thundering herd" problem. A thundering herd problem occurs when a large number of processes waiting for an event are awoken when that event occurs, but only one process is able to proceed at a time. After the processes wake up, they all demand the resource and a decision must be made as to which process can continue. After the decision is made, the remaining processes are put back to sleep, only to all wake up again to request access to the resource.

Figure 5:
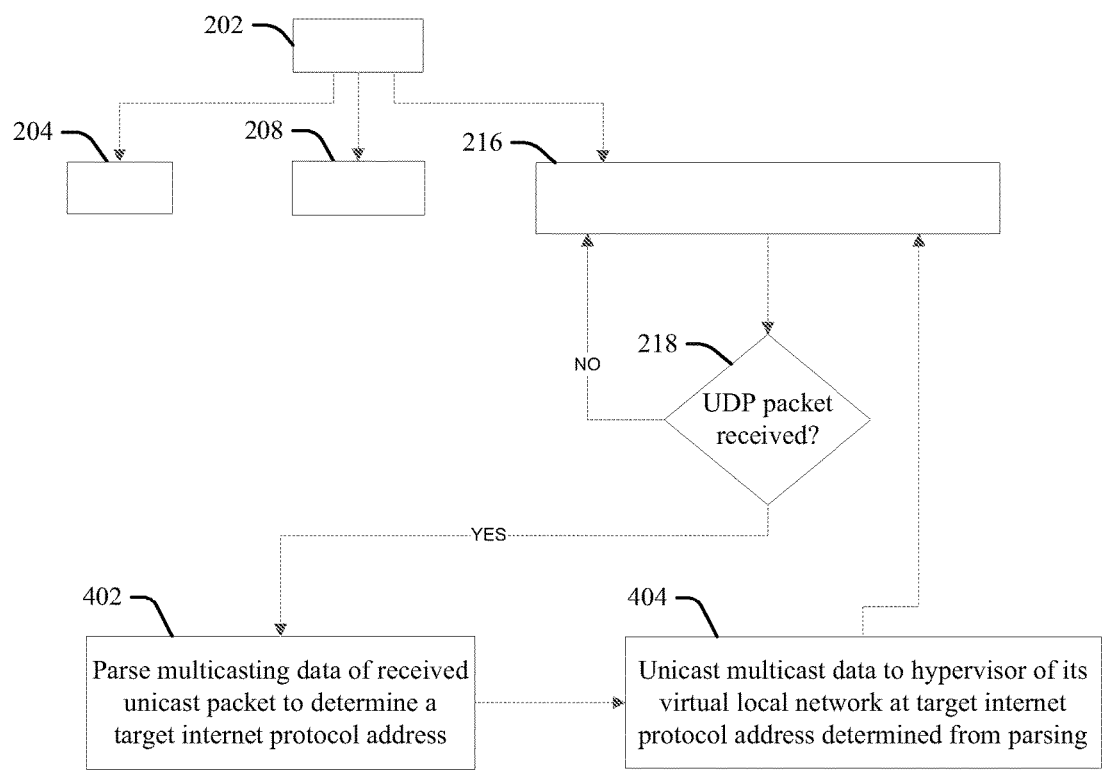
FIG. 5 is a flow chart illustration of another embodiment of the present invention.

FIG. 5 is an illustration of an alternative embodiment of the present invention comprising a channel mode configuration, rather than the transparent mode configuration of FIG. 3. This channel mode vxhelper daemon perform three different functions or jobs at the same time, in parallel, two of which are as described above with respect to FIG. 3: listening for administrator control commands for new peer vxhelper daemon IP address data at steps 204-206, and relaying multicast packet data as UDP packets to other vxhelper daemons at steps 208-214.

However, a third of the parallel jobs diverges from the steps of multicasting UDP packets received from other vxhelper daemons and multicasting data therein on its local VLAN, At step 216 the vxhelper daemon listens to the designated or appropriate packet receiving port (port 8896 of an OPENSTACK implementation, or other port number for a different VXLAN implementation) for any incoming UDP packet directed to it and sent from other vxhelper daemons as generated, such as those and sent at steps 208-214. In response to receiving one of said incoming UDP packets from a peer vxhelper daemon at 218, at 402 the vxhelper daemon parses (via an appropriate virtual extensible local area network encapsulation format of its virtual local area network) multicasting data of the received other unicast packet to determine a target internet protocol address from within the parsed multicast data.

At 404 the vxhelper daemon unicasts the parsed multicast data to a hypervisor of its virtual local network at the target internet protocol address determined from parsing at 402. Thus, the channel mode embodiment enables hypervisors in different data centers to directly communicate with each other through intervening firewalls, via use of their respective vxhelper daemons.

One channel mode example embodiment uses an "iptables" tool to manage security system "firewall" rules, and a mangle table for specialized packet alteration, to alter Quality of Service (QOS) bits in the Transmission Control Protocol (TCP) header, wherein each VLAN hypervisors is configured via the following program code instructions:

iptables -t mangle -N DIVERT
    iptables -t mangle -A DIVERT -j MARK --set-mark 1
    iptables -t mangle -A OUTPUT -o eth0 -p tcp --dport 8472 --destination !LOCAL_SUBNETS -j DIVERT
    ip rule add fwmark 1 lookup 100
    ip route add via VXHELPER_IP table 100

The vxhelper daemon nodes are further configured via the following program code instructions:

iptables -t mangle -N DIVERT
    iptables -t mangle -A DIVERT -j MARK --set-mark 1
    iptables -t mangle -A PREROUTING -p tcp -m socket --dport 8472 -j DIVERT
    ip rule add fwmark 1 lookup 100
    ip route add local 0.0.0.0/0 dev lo table 100

When large numbers of different datacenter VLANs join a multicast group, multicasting packets to unrelated regions reduce efficiency. Some vxhelper daemon embodiments of the present invention provide additional advantages by learning common broadcast packets (ARP, DHCP, etc.) used to exchange information between the vxhelper daemon peers. Such embodiments need not forward packets to other regions (those within the multicast group by not including a destination hypervisor for the particular packet), but instead respond directly to the learned packet, for example working as an ARP or DHCP proxy.

The present invention provides advantages over prior art approaches. For example, hardware VXLAN gateway devices may enable multicasting to other datacenters, but such devices are costlier to deploy and maintain relative to the structures of the present invention, and may also fail to support VXLAN.

Prior art OPENSTACK "L2 population" approaches may be used to manage the forwarding tables (FDB) of virtual switches. However, such approaches generally require an agent process running on each hypervisor in a tenant, and each agent process needs the ability to obtain data in real-time from cloud management service and populate the FDB table on hypervisor. This configuration is more complicated and risky, and less time efficient, compared to aspects of the present invention, and further is unrealistic for agile deployments of services by public cloud service providers.

Prior art multicast routing structures are known, but they are usually limited to deployment within a single VLAN, and generally require more service provider administration resources to maintain relative to aspects of the present invention. Internet and public routers are generally unable to provide multicasting between different data centers, and even if possible, configuring such multicasting attributes for bi-directional communication is more complicated and risky to configure, relative to aspects of the present invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a multicast helper to communicate between different virtual extensible local area networks, comprising executing on a computer processor the steps of:
monitoring a listening port connection of a first virtual local area network for multicast packets from hypervisor virtual machines of the first virtual local area network that meet a multicast group definition;
in response to receiving, via the monitoring, a first user datagram protocol multicast packet from an original hypervisor source within the first virtual local area network that meets the multicast group definition, retrieving a source address for the original hypervisor source;
binding the retrieved source address to the multicast packet to generate a first encapsulated packet; and
forwarding the first encapsulated packet as a first user datagram protocol unicast packet to a destination address of a virtual extensible helper daemon defined for a destination hypervisor of a second virtual local area network, via a designated receiving port of the second virtual local area network, wherein the destination address meets the multicast group definition for the first virtual local area network, and wherein the second virtual local area network is geographically remote from and different from the first virtual local area network, thereby sending the first user datagram protocol unicast packet through an internet protocol router to the designated receiving port.

2. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the steps of monitoring the listening port connection for the multicast packets from the hypervisor virtual machines of the first virtual local area network that meet the multicast group definition, retrieving the source address for the original hypervisor source in response to receiving the first user datagram protocol multicast packet, binding the retrieved source address to the multicast packet to generate the first encapsulated packet, and forwarding the first encapsulated packet as the first user datagram protocol unicast packet to the destination address of the virtual extensible helper daemon defined for the destination hypervisor of the second virtual local area network via the internet protocol router to the designated receiving port of the second virtual local area network.

3. The method of claim 2, wherein the computer-readable program code is provided as a service in a cloud environment.

4. The method of claim 1, further comprising:
monitoring a receiving port of the first virtual local area network for packets unicast to an address of a virtual extensible helper daemon defined for the first virtual local area network;
in response to receiving, via the monitoring, a unicast packet directed to the address of the virtual extensible helper daemon:
retrieving an encapsulating source address data from the received unicast packet of a second virtual machine hosted on a second hypervisor of the second virtual local area network;
multicasting data of the received unicast packet to the first virtual local area network pursuant to the multicast group definition; and
updating a local forwarding database of a receiving hypervisor of the first virtual local area network that receives the multicast data with an internet protocol address of the second hypervisor, and with a media access control address of the second virtual machine retrieved from the encapsulating source address data.

5. The method of claim 4, further comprising:
enabling, via the updating of the local forwarding database, the receiving hypervisor of the first virtual local area network to send a subsequent user datagram protocol packet addressed to the second virtual machine hosted on the second hypervisor of the second virtual local area network as a unicast packet addressed to the second virtual machine hosted on the second hypervisor.

6. The method of claim 4, wherein the first user datagram protocol multicast packet is selected from the group consisting of an address resolution protocol packet and a dynamic host configuration protocol packet.

7. The method of claim 4, further comprising:

in response to receiving via the monitoring an other unicast packet directed to the address of the virtual extensible helper daemon:

parsing, according to an appropriate virtual extensible local area network encapsulation format of the first virtual local area network, multicasting data of the received other unicast packet to determine a target internet protocol address from within the parsed multicast data; and unicasting the parsed multicast data to a hypervisor of the first virtual local network at the determined target internet protocol address.

8. The method of claim 7, wherein the step of unicasting the parsed multicast data to the hypervisor of the first virtual local network at the determined target internet protocol address further comprises:

using an iptables tool to manage security system firewall rules stored in a database; and using a mangle table to alter quality of service bits in a transmission control protocol header of the parsed multicast data, as a function of the managed security system firewall rules stored in the database.

9. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

monitors a listening port connection of a first virtual local area network for multicast packets from hypervisor virtual machines of the first virtual local area network that meet a multicast group definition;

in response to receiving, via the monitoring, a first user datagram protocol multicast packet from an original hypervisor source within the first virtual local area network that meets the multicast group definition, retrieves a source address for the original hypervisor source;

binds the retrieved source address to the multicast packet to generate a first encapsulated packet; and forwards the first encapsulated packet as a first user datagram protocol unicast packet to a destination address of a virtual extensible helper daemon defined for a destination hypervisor of a second virtual local area network, via a designated receiving port of the second virtual local area network, wherein the destination address meets the multicast group definition for the first virtual local area network, and wherein the second virtual local area network is geographically remote from and different from the first virtual local area network, thereby sending the first user datagram protocol unicast packet through an internet protocol router to the designated receiving port.

10. The system of claim 9, wherein the processor executes the program instructions stored on the computer-readable storage medium via the computer readable memory and thereby further:

monitors a receiving port of the first virtual local area network for packets unicast to an address of a virtual extensible helper daemon defined for the first virtual local area network;

in response to receiving, via the monitoring, a unicast packet directed to the address of the virtual extensible helper daemon:

retrieves an encapsulating source address data from the received unicast packet of a second virtual machine hosted on a second hypervisor of the second virtual local area network;

multicasts data of the received unicast packet to the first virtual local area network pursuant to the multicast group definition; and updates a local forwarding database of a receiving hypervisor of the first virtual local area network that receives the multicast data with an internet protocol address of the second hypervisor, and with a media access control address of the second virtual machine retrieved from the encapsulating source address data.

11. The system of claim 10, wherein the processor executes the program instructions stored on the computer-readable storage medium via the computer readable memory and thereby further:

enables, via the updating of the local forwarding database, the receiving hypervisor of the first virtual local network to send a subsequent user datagram protocol packet addressed to the second virtual machine hosted on the second hypervisor of the second virtual local area network as a unicast packet addressed to the second virtual machine hosted on the second hypervisor.

12. The system of claim 10, wherein the first user datagram protocol multicast packet is selected from the group consisting of an address resolution protocol packet and a dynamic host configuration protocol packet.

13. The system of claim 10, wherein the processor executes the program instructions stored on the computer-readable storage medium via the computer readable memory and thereby further, in response to receiving via the monitoring an other unicast packet directed to the address of the virtual extensible helper daemon:

parses, according to an appropriate virtual extensible local area network encapsulation format of the first virtual local area network, multicasting data of the received other unicast packet to determine a target internet protocol address from within the parsed multicast data; and unicasts the parsed multicast data to a hypervisor of the first virtual local network at the determined target internet protocol address.

14. The system of claim 13, wherein the processor executes the program instructions stored on the computer-readable storage medium via the computer readable memory and thereby further unicasts the parsed multicast data to the hypervisor of the first virtual local network at the determined target internet protocol address by:

using an iptables tool to manage security system firewall rules stored in a database; and using a mangle table to alter quality of service bits in a transmission control protocol header of the parsed multicast data, as a function of the managed security system firewall rules stored in the database.

15. A computer program product for a multicast helper to communicate between different virtual extensible local area networks, the computer program product comprising:

a computer readable storage medium having computer readable program code embodied therewith, wherein the computer readable storage medium is not a transitory signal per se, the computer readable program code comprising instructions for execution by a processor that cause the processor to:

monitor a listening port connection of a first virtual local area network for multicast packets from hypervisor virtual machines of the first virtual local area network that meet a multicast group definition;

in response to receiving, via the monitoring, a first user datagram protocol multicast packet from an original hypervisor source within the first virtual local area network that meets the multicast group definition, retrieve a source address for the original hypervisor source;

bind the retrieved source address to the multicast packet to generate a first encapsulated packet; and forward the first encapsulated packet as a first user datagram protocol unicast packet to a destination address of a virtual extensible helper daemon defined for a destination hypervisor of a second virtual local area network, via a designated receiving port of the second virtual local area network, wherein the destination address meets the multicast group definition for the first virtual local area network, and wherein the second virtual local area network is geographically remote from and different from the first virtual local area network, thereby sending the first user datagram protocol unicast packet through an internet protocol router to the designated receiving port.

16. The computer program product of claim 15, wherein the computer readable program code instructions for execution by the processor further cause the processor to:

monitor a receiving port of the first virtual local area network for packets unicast to an address of a virtual extensible helper daemon defined for the first virtual local area network;

in response to receiving, via the monitoring, a unicast packet directed to the address of the virtual extensible helper daemon:

retrieve an encapsulating source address data from the received unicast packet of a second virtual machine hosted on a second hypervisor of the second virtual local area network;

multicast data of the received unicast packet to the first virtual local area network pursuant to the multicast group definition; and update a local forwarding database of a receiving hypervisor of the first virtual local area network that receives the multicast data with an internet protocol address of the second hypervisor, and with a media access control address of the second virtual machine retrieved from the encapsulating source address data.

17. The computer program product of claim 16, wherein the computer readable program code instructions for execution by the processor further cause the processor to:

enable, via the updating of the local forwarding database, the receiving hypervisor of the first virtual local network to send a subsequent user datagram protocol packet addressed to the second virtual machine hosted on the second hypervisor of the second virtual local area network as a unicast packet addressed to the second virtual machine hosted on the second hypervisor.

18. The computer program product of claim 16, wherein the first user datagram protocol multicast packet is selected from the group consisting of an address resolution protocol packet and a dynamic host configuration protocol packet.

19. The computer program product of claim 16, wherein the computer readable program code instructions for execution by the processor further cause the processor to, in response to receiving via the monitoring an other unicast packet directed to the address of the virtual extensible helper daemon:

parse, according to an appropriate virtual extensible local area network encapsulation format of the first virtual local area network, multicasting data of the received other unicast packet to determine a target internet protocol address from within the parsed multicast data; and unicast the parsed multicast data to a hypervisor of the first virtual local network at the determined target internet protocol address.

20. The computer program product of claim 16, wherein the computer readable program code instructions for execution by the processor further cause the processor to unicast the parsed multicast data to the hypervisor of the first virtual local network at the determined target internet protocol address by:

using an iptables tool to manage security system firewall rules stored in a database; and using a mangle table to alter quality of service bits in a transmission control protocol header of the parsed multicast data, as a function of the managed security system firewall rules stored in the database.

* * * * *